(12) United States Patent
Fehr

(10) Patent No.: US 9,618,338 B2
(45) Date of Patent: Apr. 11, 2017

(54) COMPENSATING FOR ACCELERATION INDUCED INCLINATION ERRORS

(71) Applicant: Caterpillar Inc., Peoria, IL (US)

(72) Inventor: Drew Fehr, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 476 days.

(21) Appl. No.: 14/218,005

(22) Filed: Mar. 18, 2014

(65) Prior Publication Data

US 2015/0268042 A1    Sep. 24, 2015

(51) Int. Cl.
*G01C 9/00* (2006.01)
*G01C 9/08* (2006.01)
*G01S 19/13* (2010.01)
*G01S 19/14* (2010.01)

(52) U.S. Cl.
CPC .............. *G01C 9/08* (2013.01); *G01S 19/13* (2013.01); *G01S 19/14* (2013.01)

(58) Field of Classification Search
CPC .......... G05D 1/0891; G05D 2201/0202; E02F 3/845; G01C 9/08; G01S 19/14; G01S 19/13

USPC ........................................ 702/150, 151, 154
See application file for complete search history.

(56) References Cited

U.S. PATENT DOCUMENTS

| | | |
|---|---|---|
| 5,860,480 A | 1/1999 | Jayaraman et al. |
| 6,826,894 B2 * | 12/2004 | Thiemann ............ A01D 41/141 56/10.2 E |
| 7,650,252 B2 | 1/2010 | Douglas |
| 8,145,391 B2 | 3/2012 | Omelchenko et al. |
| 2012/0239258 A1 | 9/2012 | Konno et al. |
| 2013/0080112 A1 | 3/2013 | Friend |

* cited by examiner

*Primary Examiner* — An Do
(74) *Attorney, Agent, or Firm* — Miller, Matthias & Hull

(57) ABSTRACT

A relative angle between a machine's direction of travel and the orientation of an inclination sensor on a work tool coupled to the machine is determined and/or calculated. In some examples, the present disclosure describes a method of determining a relative angle between a machine's direction of travel and an inclination sensor coupled to a work tool coupled to the machine. Such method may include determining the machine's direction of travel, and determining an orientation of the inclination sensor coupled to the work tool coupled to the machine. The relative angle between the machine's direction of travel and the orientation of the inclination sensor coupled to the work tool may then be calculated.

20 Claims, 6 Drawing Sheets

US 9,618,338 B2

COMPENSATING FOR ACCELERATION INDUCED INCLINATION ERRORS

TECHNICAL FIELD

This patent disclosure relates generally to determining and/or calculating the relative angle between the machine's direction of travel and the orientation of an inclination sensor on a work tool coupled to the machine.

BACKGROUND

Inclination angles are conventionally sensed by measuring acceleration due to gravity using accelerometers mounted to a machine. When non-gravity induced accelerations are present during the machine's operation, the inclination sensor provides false readings. Therefore, there is a need to remove non-gravity acceleration errors.

Some examples of non-gravity induced accelerations are vibrations, changes in track/wheel speed, changes in machine speed causing wheel/track slip, and changes in pitch rate of the machine.

The non-gravity acceleration caused by wheel/track speed can be calculated by differentiating the wheel or track speed sensor signal. Conventionally, the inclination sensor is mounted to the machine's body so that it is aligned with the direction of travel (or at a fixed angle) and the calculated wheel/track acceleration can be directly subtracted from the inclination acceleration measurement. However, some machines have the inclination sensor mounted to a work tool that can be moved (e.g., bull dozer blade and or linkage). In this case, the calculated wheel/track acceleration and inclination sensor may not be aligned and the angle relative to the direction of travel changes.

Inclination angles are commonly determined by fusing inclination sensor data with integrated angular rate data using a Kalman filter. The integrated angular rate data is not affected by accelerations, but it contains a bias that drifts, causing errors. The Kalman filter uses the inclination sensor data to correct the integrated angular rate bias. The measurement variance of the inclination angle dictates how much the Kalman filter trusts the inclination angle measurement. When non-gravity accelerations occur, the false inclination causes the Kalman filter to incorrectly compensate the integrated angular rate bias. Methods to correct for the measurement error of the inclination sensor by removing as many of these non-gravity accelerations as possible may be desirable.

In other solutions, such as in U.S. Pat. No. 5,860,480, titled "Method and apparatus for determining pitch and ground speed of an earth moving machines," higher accuracy angular rate sensors are used so that compensation to the inclination measurement is not as critical. Additionally, inclination sensors are typically mounted to the body of the machine and other sensors (e.g., cylinder position sensors, rotary position sensors), also present in the system of U.S. Pat. No. 5,860,480, are used to measure the work tool orientation relative to the body. In these situations the inclinometer is aligned with the direction of travel (or at a fixed angle) and the calculated wheel/track acceleration may be directly subtracted from the inclination acceleration measurement. Both options are expensive. Accordingly, there is a need for improved methods and systems for determining the relative angle between the machine's direction of travel and the orientation of an inclination sensor on a work tool.

SUMMARY

In some examples, the present disclosure describes a method of determining a relative angle between a machine's direction of travel and an inclination sensor coupled to a work tool coupled to the machine. Such method may include determining the machine's direction of travel, and determining an orientation of the inclination sensor coupled to the work tool coupled to the machine. The relative angle between the machine's direction of travel and the orientation of the inclination sensor coupled to the work tool may then be calculated.

In some examples, the present disclosure describes a system including a machine having a work tool attached thereto. The system may also include an inclination sensor coupled to the work tool, the inclination sensor configured to sense an orientation of the work tool. The system may further include a slope estimation tool coupled to at least one of the work tool and the machine, the slope estimation tool configured to estimate a slope of a surface on which the machine has traveled.

In some examples, the present disclosure describes a method including estimating a slope associated with a machine's direction of travel, the slope being the difference in elevation between at least two locations in the machine's direction of travel. The method may also include determining an orientation of an inclination sensor coupled to a work tool coupled to the machine, and calculating a relative angle between the slope and the orientation of the inclination sensor coupled to the work tool.

DETAILED DESCRIPTION

It should be noted that the methods and systems described herein may be adapted to a large variety of machines. The machine may be an "over-the-road" vehicle such as a truck used in transportation or may be any other type of machine that performs some type of operation associated with an industry such as mining, construction, farming, transportation, or any other industry known in the art. For example, the machine may be an off-highway truck, earth-moving machine, such as a dozer, wheel loader, excavator, dump truck, backhoe, motor grader, material handler, and the like.

Further, it should be noted that the Figures are illustrative only and they are not drawn to scale.

Figure 1:
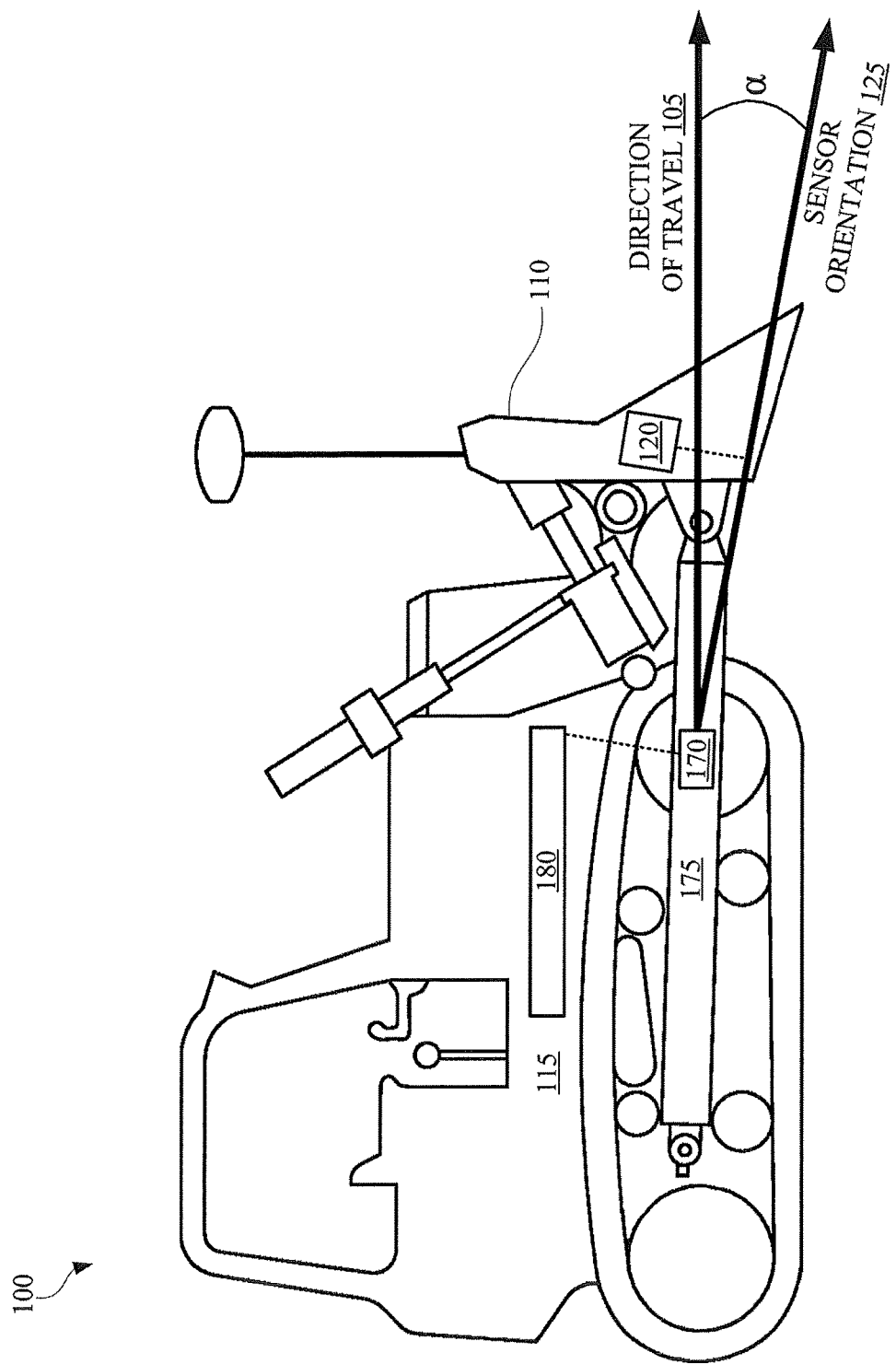
FIG. 1 is a side view of an example machine in accordance with at least one embodiment of the present disclosure.

FIG. 1 is a side view of an example machine 100 in accordance with at least one embodiment of the present disclosure. In some examples, machine 100 may include a frame 115 and a work tool 110 (such as a dozer blade) temporarily or permanently coupled to the machine 100. The work tool 110 may be supported by a tool support 175 that extends from the frame 115. The tool support 175 includes a pair of hydraulic cylinders for raising and lowering the work tool 110 in relation to the frame 115. The tool support 175 may further include a pair of arms and cylinders such that the cylinders may be extended or retracted to lower or to raise work tool 110, respectively. The machine 100 may also have a cab from which an operator may manually operate various controls to control the operation of the machine 100.

In some examples, machine 100 may include an inclination sensor 120 coupled to the work tool 110. An example inclination sensor 120 may include an inertial measurement unit (IMU) 120 that may include a set of sensors that measure six (6) degrees of freedom—three (3) linear degrees of freedom (such as x, y, and z coordinates in space) and three (3) rotational degrees of freedom such as (pitch, yaw, and roll). The linear degrees of freedom specify a position, and the rotational degrees of freedom specify attitude.

Some example inclination sensor 120 (e.g., IMUs) may include three (3) linear accelerometers for determining position and three (3) rate gyroscopes for determining attitude. Based upon the measurements of position and attitude, a computational unit, such as a circuit or controller, may determine position and attitude information of the machine 100.

Figure 2:
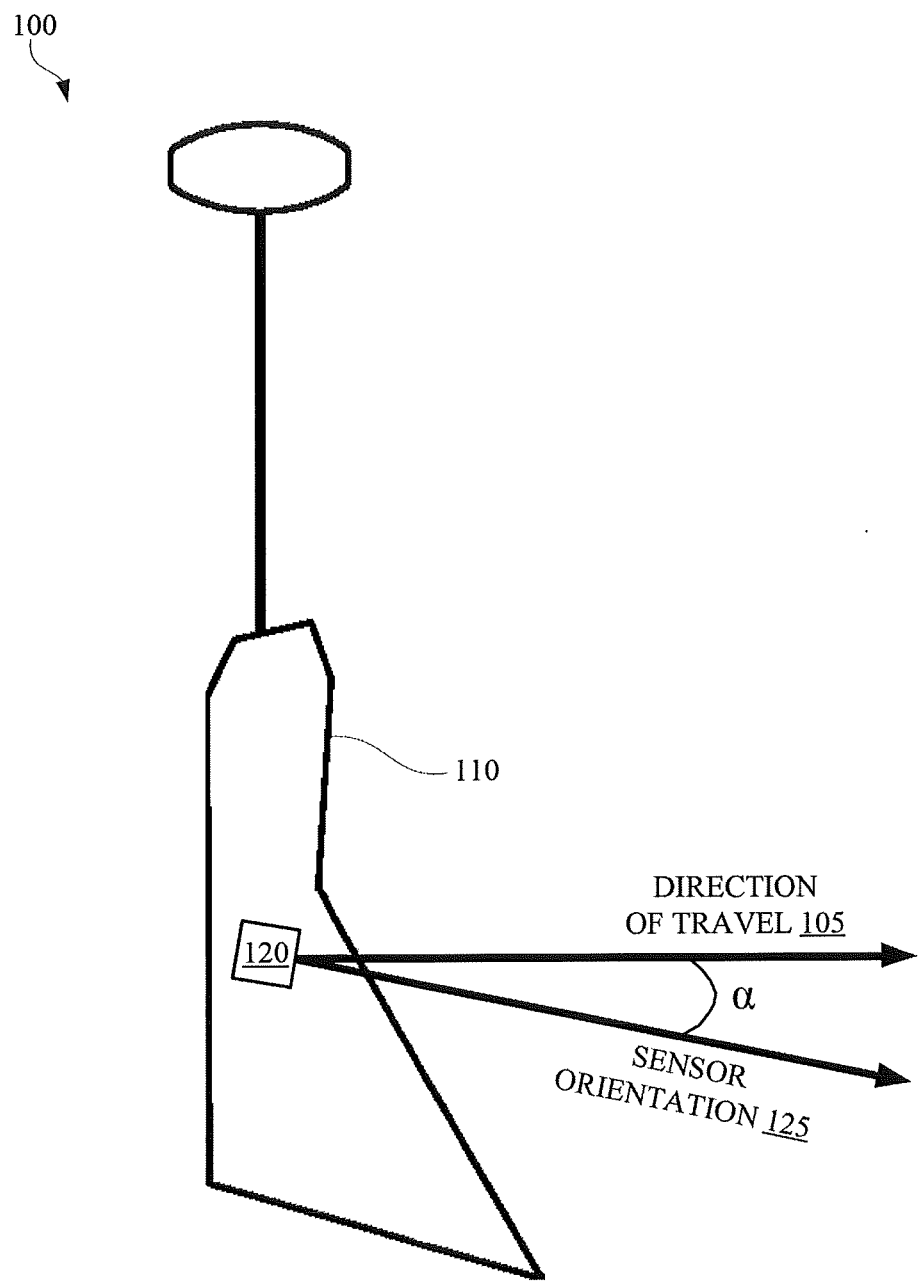
FIG. 2 is a side view of an example work tool in accordance with at least one embodiment of the present disclosure.

Example machine 100 may determine the relative angle $\alpha$ by directly measuring the inclination sensor orientation 125 relative to the direction of the travel of the machine 100. FIG. 2 shows a detailed view of the example work tool 110 of FIG. 1.

This direct measurement may be done via one or more measurement sensors such as rotary position sensor 170, cylinder position sensors 180, cameras, and/or ultrasonic sensors.

For example, rotary position sensor 170 may be coupled to a linkage of machine 100, and cylinder position sensor 180 may measure a cylinder coupling the tool support 175 to the machine 100. As the cylinder extends and retracts, the tool support 175 moves corresponding to the length of extension or retraction. This movement of the tool support 175 corresponds to movement of the work tool 110. The rotary position sensor 170 may sense the rotation of the tool support 175 when moved. Therefore, the cylinder position sensor 180 may measure the position of the cylinder and, with the measurement of the rotary position sensor 170, the relative angle $\alpha$ may be directly measured.

The cylinder position sensor 180 may output cylinder position data to a computational unit, such as a circuit or controller, and the rotary position sensor 170 may output rotary position data to the computational unit. The computational unit may directly determine the relative angle $\alpha$ based on the cylinder position data and the rotary position data.

Figure 3:
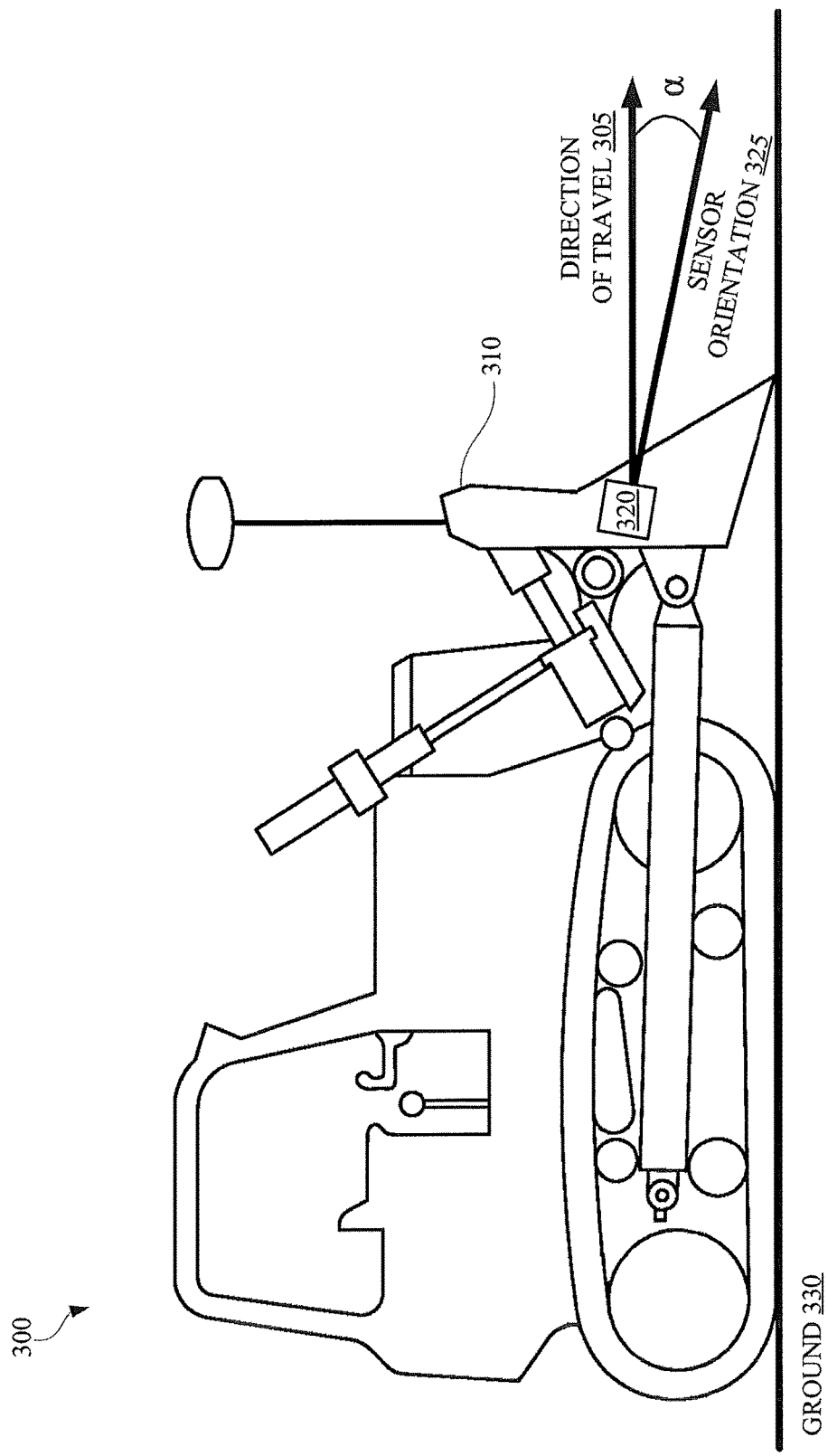
FIG. 3 is a side view of another example machine in accordance with at least one embodiment of the present disclosure.

FIG. 3 is a side view of another example machine 300 in accordance with at least one embodiment of the present disclosure. Like the machine 100 in FIG. 1, example machine 300 includes a work tool 310 having an inclination sensor 320 coupled thereto. However, example machine 300 may first be calibrated in the position in which the work tool 310 will be operating. The work tool 310 may be placed against a ground surface 330. In this position, the inclination sensor 320 may measure the relative angle $\alpha$ between the machine's 300 direction of travel 305 and the inclination sensor orientation 325. Inclination sensor 320 may use one or more accelerometers and/or gyroscopes to determine the relative angle $\alpha$ while the work tool 310 is in the position in which it will be primarily used. For example, in land grating, the work tool 310 may be placed against the ground surface 330, and the relative angle $\alpha$ may then be determined using the inclination sensor 320.

Figure 4:
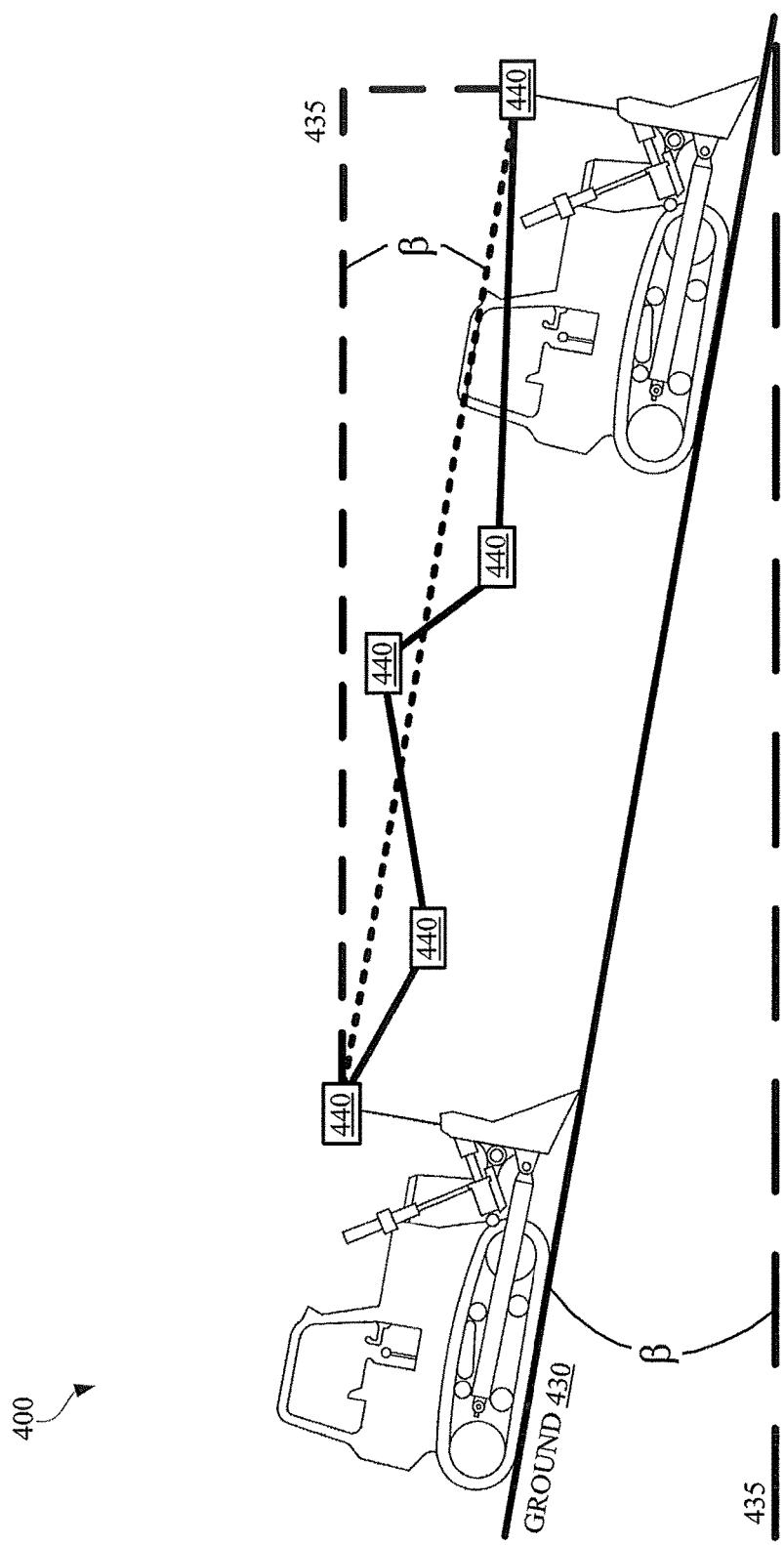
FIG. 4 is a side view of an example machine operating on a sloped surface in accordance with at least one embodiment of the present disclosure.

FIG. 4 is a side view of an example machine 400 operating over time in accordance with at least one embodiment of the present disclosure. Example machine 400 may operate over a sloped ground surface 430 during operation. The slope $\beta$ of the ground surface 430 (relative to a horizontal plane 435) may be used in some methods of determining the relative angle $\alpha$. A slope estimation tool may estimate or determine the slope $\beta$ of the ground surface 430. Some example slope estimation tools may include a receiver (such as in FIGS. 4-5), an inclination sensor on the machine (such as in FIG. 6), and/or other tools known to estimate or determine the slope of a ground surface.

As the machine 400 travels, a receiver 440 coupled to the machine 400 or the work tool may receive a signal relating to its position (i.e., its specific position relative to the Earth) and may receive the signal from one or more satellites associated with GPS, GLONASS or GNSS. The position may include a horizontal position and a vertical position of receiver 440. When the receiver 440 is coupled to the work tool of machine 400 and the work tool is in use (e.g., work tool moving vertically upward and downward over time), a two or more positions may be received by the receiver 440, including a series of horizontal positions and a series of vertical positions. This information may include or be used to determine elevation or altitude (e.g., distance above sea level) of the receiver 440 along the path that the machine travels. Using known mathematical principles, the average slope $\beta$ of the receiver 440 may be estimated. This slope $\beta$ of the receiver 440 may approximate the slope $\beta$ of the ground surface 430.

Figure 5:
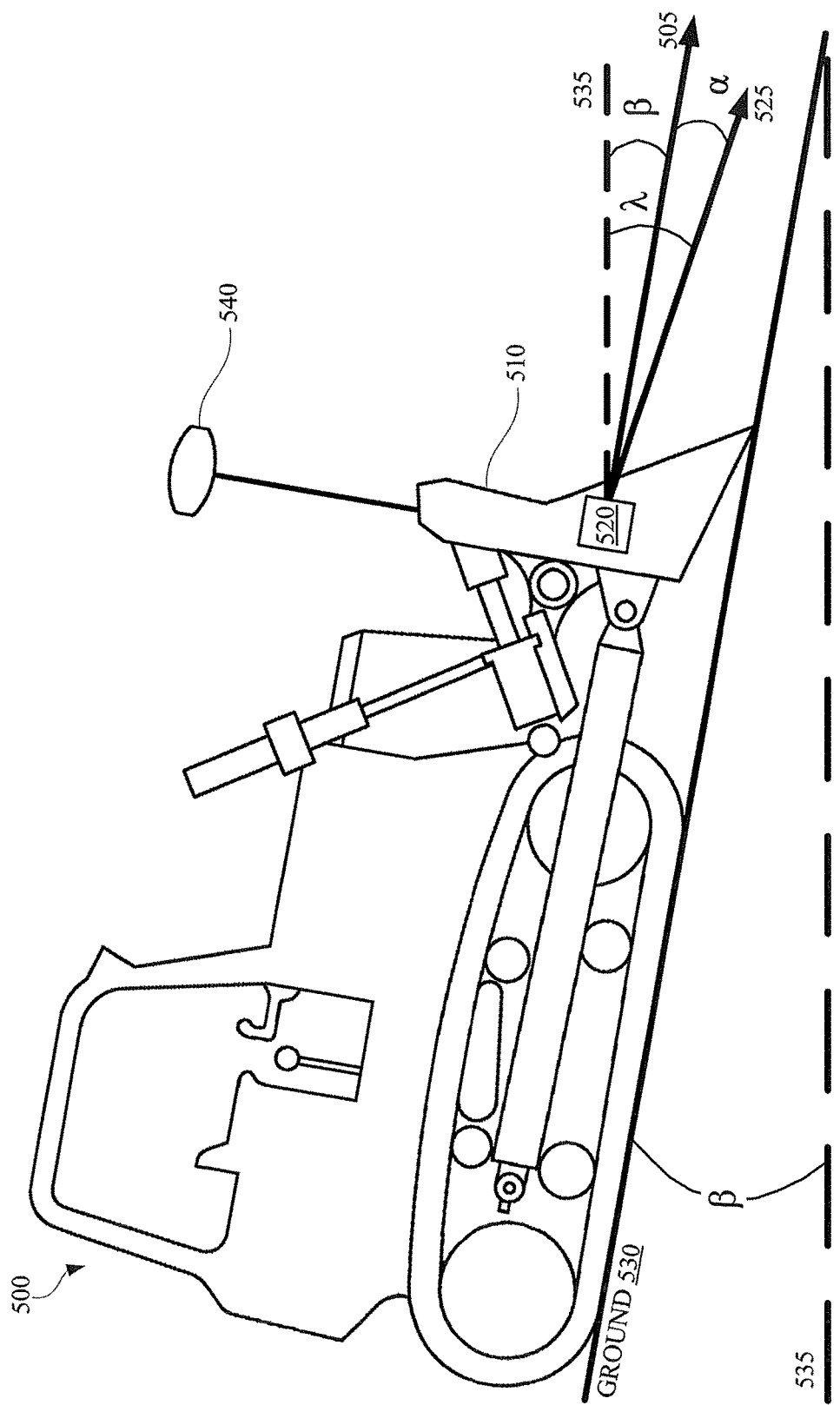
FIG. 5 is a side view of yet another example machine in accordance with at least one embodiment of the present disclosure.

FIG. 5 is a side view of yet another example machine 500 in accordance with at least one embodiment of the present disclosure. Example machine 500 may include a work tool 510 coupled thereto. The work tool 510 may include an inclination sensor 520 and a receiver 540 coupled to the work tool 510. In some examples, the inclination sensor 520 may include an IMU having one or more accelerometers and gyroscopes, and the receiver 540 may include a GPS receiver.

The relative angle $\alpha$ between the direction of travel 505 of machine 500 and the orientation 525 of inclination sensor 520 may be determined by calculating the difference between the slope $\beta$ of the ground surface on which the machine 500 is traveling and the pitch (relative to horizontal plane 535) of the inclination sensor 520. The slope $\beta$ of the ground surface may be determined, measured, and/or estimated by using known methods, such as those discussed in relation to FIG. 4, via the position information received by receiver 540. The pitch of the inclination sensor 520 may be determined, measured, and/or estimated by inclination sensor 520 (e.g., gyroscope of IMU). The pitch of the inclination sensor 520 may be subtracted from the slope $\beta$ of the ground surface 530 to obtain the relative angle $\alpha$.

Figure 6:
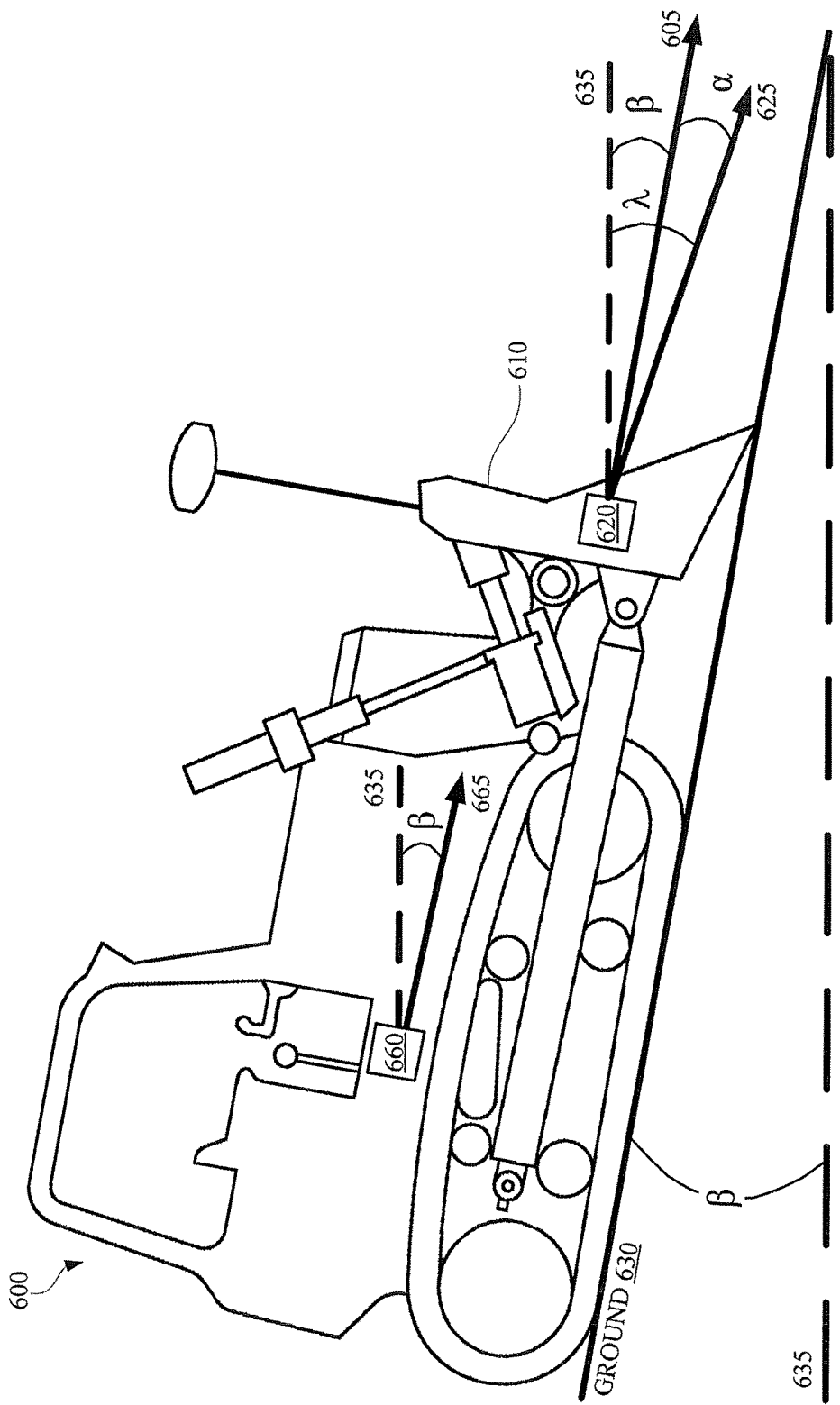
FIG. 6 is a side view of still yet another example machine in accordance with at least one embodiment of the present disclosure.

FIG. 6 is a side view of another example machine 600 in accordance with at least one embodiment of the present disclosure. Example machine 600 may include a work tool 610 coupled thereto. The work tool 610 may include an inclination sensor 620 coupled to the work tool 610 and another inclination sensor 660 coupled to the machine 600 (such as on the frame). In some examples, the inclination sensor 620 may include an IMU having one or more accelerometers and gyroscopes. In some examples, the inclination sensor 660 may include an IMU having one or more accelerometers and gyroscopes.

The relative angle α between the direction of travel 605 of machine 600 and the orientation 625 of inclination sensor 620 may be determined by calculating the difference between the slope β of the inclination sensor 660 and the pitch (relative to horizontal plane 635) of the inclination sensor 620. The slope β of the inclination sensor 660 may be determined, measured, and/or estimated by inclination sensor 660 (e.g., IMU). The pitch of the inclination sensor 620 may be determined, measured, and/or estimated by inclination sensor 620 (e.g., gyroscope of IMU). The pitch of the inclination sensor 620 may be subtracted from the slope β of the inclination sensor 660 to obtain the relative angle α. In this example, a receiver is not used to determine the slope β and, in turn, the relative angle α.

INDUSTRIAL APPLICABILITY

The present disclosure is applicable to a variety of machines in general (e.g., track-type tractors, skid steer loaders). Such machines may operate in an inclined position relative to a horizontal plane. It may be helpful for many functions of the machines to know or be able to determine the angle of inclination of the machine at any given moment. However, non-gravity induced accelerations such as vibrations, track/wheel speed changes, and machine speed changes, provide false readings from the inclination sensors. These types of non-gravity induced accelerations are typical when machines are used for construction, farming, and other tasks in difficult terrain.

The non-gravity induced accelerations introduce errors into the inclination sensor data. To compensate for these errors, a machine may determine the angle relative to the direction of travel of the machine. In this manner, the machine may more accurately determine the angle of inclination without using the erroneous data from the inclination sensors. Accordingly, the accuracy of determining the angle of inclination will be improved.

In some examples, a system for calculating may be provided. Example systems may include a computing device operatively enabled to perform the method(s) herein to remove non-gravity acceleration errors.

In some examples, an example non-transitory storage medium may include machine-readable instructions stored thereon which, when executed by processing unit(s) of a computing device, operatively enable the computing device to calculate the relative angle between the machine's direction or travel and the orientation of an inclination sensor coupled to a work tool on the machine.

Example computing devices may be of any suitable construction, however in one example it may include a digital processor system including a microprocessor circuit having data inputs and control outputs, operating in accordance with computer-readable instructions stored on a computer-readable medium. In some examples, the processor may have associated therewith long-term (non-volatile) memory for storing the program instructions, as well as short-term (volatile) memory for storing operands and results during (or resulting from) processing. Further, computing device may read computer-executable instructions from a computer-readable medium and executes those instructions. Example media readable by a computer may include both tangible and intangible media. Examples of the former include magnetic discs, optical discs, flash memory, RAM, ROM, tapes, cards, and the like. Examples of the latter include acoustic signals, electrical signals, AM and FM waves, etc.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

All methods described herein may be performed in any suitable order unless otherwise indicated herein or otherwise clearly contradicted by context.

I claim:

1. A method of determining a relative angle between a machine's direction of travel and an inclination sensor coupled to a work tool coupled to the machine, the method comprising:
    determining the machine's direction of travel;
    determining an orientation of the inclination sensor coupled to the work tool coupled to the machine; and
    calculating the relative angle between the machine's direction of travel and the orientation of the inclination sensor coupled to the work tool, the relative angle being determined by a processor by calculating a difference between a slope of a ground surface on which the machine is travelling and a pitch relative to a horizontal plane of the inclination sensor.

2. The method of claim 1, wherein determining the orientation of the inclination sensor coupled to the work tool comprises at least one of:
    receiving a rotary position output from a rotary position sensor; and
    receiving a cylinder position output from a cylinder position sensor.

3. The method of claim 2, wherein calculating the relative angle comprises calculating the relative angle based on at least one of the rotary position output and the cylinder position output.

4. The method of claim 1, wherein determining the orientation of the inclination sensor coupled to the work tool comprises positioning the work tool on a ground surface prior to determining the orientation of the inclination sensor coupled to the work tool.

5. The method of claim 1, wherein determining the machine's direction of travel comprises:
    estimating a slope of a surface on which the machine has traveled.

6. The method of claim 5, wherein the estimating the slope of the surface comprises:
    measuring a first elevation of the machine at a first location of the machine;
    measuring a second elevation of the machine at a second location of the machine;
    estimating the slope based at least on the first elevation of the machine and the second elevation of the machine.

7. The method of claim 5, wherein the estimating the slope of the surface comprises:
    measuring a first elevation of the work tool at a first location of the machine;

measuring a second elevation of the work tool at a second location of the machine;

estimating the slope based at least on the first elevation of the work tool and the second elevation of the work tool.

8. The method of claim 5, wherein the machine's direction of travel is the slope of the surface.

9. The method of claim 5, wherein calculating the relative angle comprises calculating a difference between the slope and the orientation of the inclination sensor coupled to the work tool.

10. The method of claim 1, wherein determining the machine's direction of travel comprises determining an orientation of an inclination sensor coupled to the machine.

11. A system, comprising:
a machine having a work tool attached thereto;
an inclination sensor coupled to the work tool, the inclination sensor configured to sense an orientation of the work tool;
a slope estimation tool coupled to at least one of the work tool and the machine, the slope estimation tool configured to estimate a slope of a surface on which the machine has traveled;
a receiver provided along a path in which the machine travels; and
a processor adapted to determine an elevation of the receiver and in turn use the elevation to determine the slope of the surface on which the machine has traveled.

12. The system of claim 11, wherein the slope estimation tool comprises an inclination sensor coupled to the machine.

13. The system of claim 12, wherein the slope estimation tool estimates the slope of the surface on which the machine has traveled by measuring an elevation of the work tool at at least two locations of the machine.

14. The system of claim 12, wherein the slope estimation tool estimates the slope of the surface on which the machine has traveled by measuring an elevation of the machine at at least two locations of the machine.

15. The system of claim 11, wherein the slope estimation tool comprises a global positioning system receiver.

16. The system of claim 11, wherein the inclination sensor comprises at least one of an inclinometer, an accelerometer, and a gyroscope.

17. A method, comprising:
estimating a slope associated with a machine's direction of travel, the slope being a difference in elevation between at least two locations in the machine's direction of travel;
determining an orientation of an inclination sensor coupled to a work tool coupled to the machine; and
calculating a relative angle between the slope and the orientation of the inclination sensor coupled to the work tool, the relative angle being determined by a processor by calculating a difference between a slope of a ground surface on which the machine is travelling and a pitch relative to a horizontal plane of the inclination sensor.

18. The method of claim 17, wherein calculating the relative angle comprises determining a difference between an angle associated with the slope and an angle associated with the orientation of the inclination sensor.

19. The method of claim 17, wherein estimating the slope comprises:
receiving a first elevation of the machine at a first location;
receiving a second elevation of the machine at a second location;
determining a difference between the first elevation and the second elevation over a distance between the first location and the second location.

20. The method of claim 17, wherein estimating the slope comprises:
sensing a first elevation and first global positioning system position of the machine at a first location;
sensing a second elevation and second global positioning system position of the machine at a second location;
determining a difference between the first elevation and the second elevation over a distance between the first global positioning system position and the second global positioning system position.

* * * * *